US006656551B1

(12) United States Patent
Dyl

(10) Patent No.: US 6,656,551 B1
(45) Date of Patent: Dec. 2, 2003

(54) INDICIA BEARING ELASTOMERIC ARTICLE

(75) Inventor: Robert Donald Dyl, Elma, NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 158 days.

(21) Appl. No.: 09/585,180

(22) Filed: Jun. 1, 2000

Related U.S. Application Data

(60) Provisional application No. 60/139,466, filed on Jun. 16, 1999.

(51) Int. Cl.[7] .......................... B32B 1/08; B32B 25/08; B32B 27/30

(52) U.S. Cl. .................. 428/36.8; 428/36.91; 428/161; 428/201; 428/421; 428/422; 428/492; 428/521; 428/542.2; 428/542.6; 428/913.3

(58) Field of Search .................... 283/79, 81; 252/965; 428/35.7, 36.8, 36.91, 421, 492, 521, 542.2, 542.6, 913.3, 161, 201, 422

(56) References Cited

U.S. PATENT DOCUMENTS

| | | | | |
|---|---|---|---|---|
| 2,419,008 A | | 4/1947 | Coffman et al. | 526/219.1 |
| 2,510,783 A | | 6/1950 | Johnston et al. | 526/212 |
| 2,599,300 A | | 6/1952 | Upson | 526/227 |
| 2,953,818 A | | 9/1960 | Bartron | 264/178 R |
| 3,133,854 A | | 5/1964 | Simms | 428/421 |
| 3,139,470 A | | 6/1964 | Prengle et al. | 264/289 |
| 3,997,604 A | * | 12/1976 | Foulletier et al. | 564/204 |
| 4,877,683 A | | 10/1989 | Bragaw, Jr. et al. | 428/421 |
| 5,139,878 A | | 8/1992 | Kim et al. | 428/421 |
| 5,238,687 A | * | 8/1993 | Magruder et al. | 424/473 |
| 5,380,391 A | | 1/1995 | Mahn, Jr. | 156/240 |
| 5,714,024 A | | 2/1998 | Tomiyama et al. | 156/137 |

FOREIGN PATENT DOCUMENTS

| | | |
|---|---|---|
| GB | 867225 | 5/1961 |
| JP | 63[1987]123527 | 11/1988 |
| WO | 00/22032 | 4/2000 |

* cited by examiner

*Primary Examiner*—Ramsey Zacharia

(57) ABSTRACT

The present invention provides for an indicia bearing elastomeric article with a smooth outer surface and a process for making the article. The indicia bearing elastomeric article includes a polymer film having indicia on one of its surfaces bonded to and flush with an elastomer layer. Since the outer surface of the article is without surface irregularities caused by the known transfer release techniques, power transmissions belts employing the invention do not generate the unwanted noise caused by the irregular surface contacting pulleys and idler rolls. The indicia provided by the invention can provide durable labeling for the article which remains visible throughout the useful life of the article.

6 Claims, 2 Drawing Sheets

INDICIA BEARING ELASTOMERIC ARTICLE

RELATED APPLICATIONS

The present application claims benefit of U.S. Provisional Application No. 60/139,466, filed Jun. 16, 1999.

FIELD OF INVENTION

This invention relates to indicia bearing elastomeric articles and a process for applying indicia to elastomeric articles.

BACKGROUND OF THE INVENTION

Manufacturers of elastomeric articles, such as tires, belts and hoses, have a need to apply indicia to such articles for purposes of identification, advertisement and inventory control. For example, in the manufacture of power transmission belts such as V-belts and banded belts used in cars and other equipment, it is common for a manufacturer to apply labels indicating a company's name, trademark, model number, date of manufacture and the like. To be beneficial, the labels need to remain intact despite the rigors of a harsh environment, e.g., an automotive engine compartment, and the indicia should be visible throughout the useful life of the belt.

A common way of labeling elastomeric articles has been by use of transfer release material. Release material of plastic film or paper is printed with indicia capable of transfer. The printed release material is typically used to apply the indicia to the elastomeric article during its manufacture and then is removed and discarded. For example, in, the manufacture of V-belts or banded belts, the release material is applied to a molding drum upon which various curable elastomer layers and reinforcing materials are sequentially wrapped. A jacket is placed over the wrapped article and the article is vulcanized. During vulcanization, the indicia are transferred from the inner surface of the release material to an adjacent elastomer layer. After the vulcanization process is completed, the release material is peeled away from the vulcanized belt leaving indicia on the outer surface of the just formed elastomeric article. However, the indicia applied in this manner then reside in a depression on the surface which is formed by the release material being present during molding. In the case of V-belts for automotive use, such irregularities on the surface of the elastomeric article generate unwanted noise when the belts are engaged with pulleys or idler rolls associated with various auxiliary equipment of the automobile engine compartments. In addition, the indicia applied in this manner reside on the outer surface of the elastomeric article and are unprotected from wear, heat, oils and harsh solvents common to the automotive environment.

SUMMARY OF THE INVENTION

The present invention provides an indicia bearing elastomeric article having a smooth outer surface. The article includes an elastomer layer having an outer and inner surface and a polymer film having an outer and inner surface, the polymer film having indicia on one of its surfaces. The inner surface of the polymer film is bonded to the outer surface of the elastomer layer so that the polymer film is flush with the outer surface of the elastomer layer making smooth the outer surface of the elastomeric article. In a preferred embodiment, polymer film is clear and the indicia is present on the inner surface of the polymer film and the polymer film serves as a protective covering for the indicia sandwiched between the polymer film and the elastomer layer, the indicia being visible through the protective covering.

The invention further provides for a process for forming an indicia bearing elastomeric article having a smooth outer surface. The process involves forming a polymer film having an outer and inner surface and applying indicia to one of the surfaces of the polymer film. The polymer film with indicia is applied to the outer surface of an elastormer layer and the film and the elastomer layer are pressed under conditions such that the film is bonded to and flush with the outer surface of the elastomer layer thereby making smooth the outer surface of the elastomeric article.

BRIEF DESCRIPTION OF THE DRAWINGS

FIG. 2 illustrates the component layers of the belt sleeve including polymer film with indicia wrapped around a molding drum.

DETAILED DESCRIPTION

Elastomeric Article

The present invention provides an indicia bearing elastomeric article with a smooth outer surface including a polymer film having indicia on one of its surfaces bonded to and flush with an elastomer layer. Since the outer surface is without surface irregularities caused by the known transfer release techniques, power transmissions belts employing the invention do not generate the unwanted noise caused by the irregular surface contacting pulleys and idler rolls. The indicia provided by the invention can provide durable labeling for the article which remains visible throughout the useful life of the article.

Figure 1:
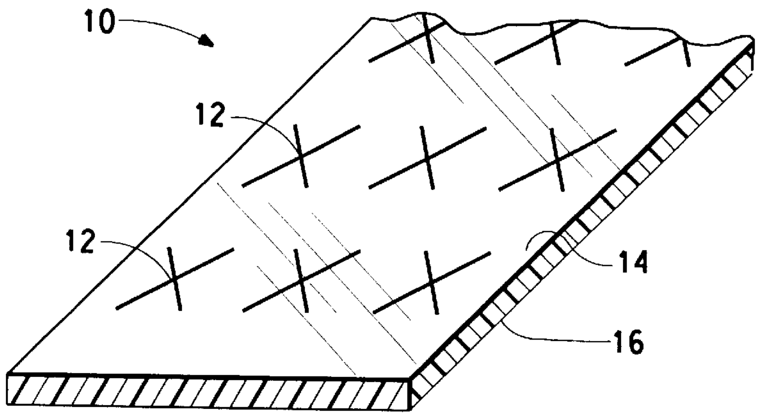
FIG. 1 is a fragmentary perspective view of a polymer film with indicia used for labeling elastomeric articles of this invention.

Referring to the figures, FIG. 1 illustrates a polymer film 10 with indicia 12 for labeling elastomeric articles in accordance with the present invention. The indicia can include any desired letters, numerals or symbols and can take a variety of forms including a company's name, trademark, model number, date of manufacture and the like. The elastomeric articles to be labeled include any number of items such as tires, mats, fan belts, power transmission belts, hoses, gloves, and gaskets.

The polymer film 10 has an outer surface 14 and an inner surface 16 with indicia applied to one of its surfaces. In a preferred form of the invention, the polymer film is clear and the indicia is printed on the inner surface 16 of the film and is visible through the polymer film. By clear it is meant that the polymer film is optically clear. Thus, the polymer film may be transparent or tinted with indicia being visible therethrough. If the indicia is a design that requires a certain orientation or a word that should be readable through the polymer film, the indicia 12 is preferably reverse printed on the inner surface 16. In this form of the invention where the indicia is printed on the inner surface of the film, the polymer film serves as a protective covering with the indicia sandwiched between the polymer film and the elastomer layer. In the case of belts for automotive use, the clear polymer film protects the indicia is from wear, high temperatures, oils and other solvents.

In an alternate embodiment where the environment for use of the elastomeric articles of this invention is not so harsh on the inks used to form the indicia, the indicia may be applied to the outer surface 14 of the polymer film. In this case, the polymer film may be clear or may be pigmented as desired even to the extent of being opaque. The indicia will typically be applied in a color which contrasts with the pigmented polymer film.

The polymer film 10 may be selected from any number of polymers which have the desired appearance, durability and processing characteristics for the particular application. Polymers for the film 10 include fluoropolymers, polyesters, polyamides, acrylate polymers, urethane polymers and acetates. Preferably, the polymer film is a fluoropolymer such as those prepared from polymers and copolymers of trifluoroethylene, hexafluoropropylene, monochlorotrifluoroethylene, dichlorodifluoroethylene, tetrafluoroethylene, vinylidene fluoride, vinyl fluoride, among others. For example, the fluoropolymer may be a fluorinated ethylene/propylene copolymer, i.e., FEP resins, a copolymer of ethylene/chlorotrifluoroethylene, vinylidene fluoride/hexafluoropropylene, and vinylidene fluoride/perfluoro (alkyl vinyl ether) dipolymers and terpolymers with tetrafluoroethylerie, polyvinylidene fluoride homopolymer (PVDF), blends of polyvinylidene fluoride (PVDF) and acrylic polymers, polyvinyl fluoride homopolymer (PVF), among others. Fluoropolymers are especially well suited to this invention because of their chemical and thermal resistance, making them especially useful for automotive Applications where high temperatures and oils are present.

The present invention is preferably employed with polyvinyl fluoride (PVF) films. When PVF film is used, the polymer film thickness is preferably in the range of 0.25 mil (6.4 $\mu$m) to about 15 mils (381 $\mu$m).

Figure 2:
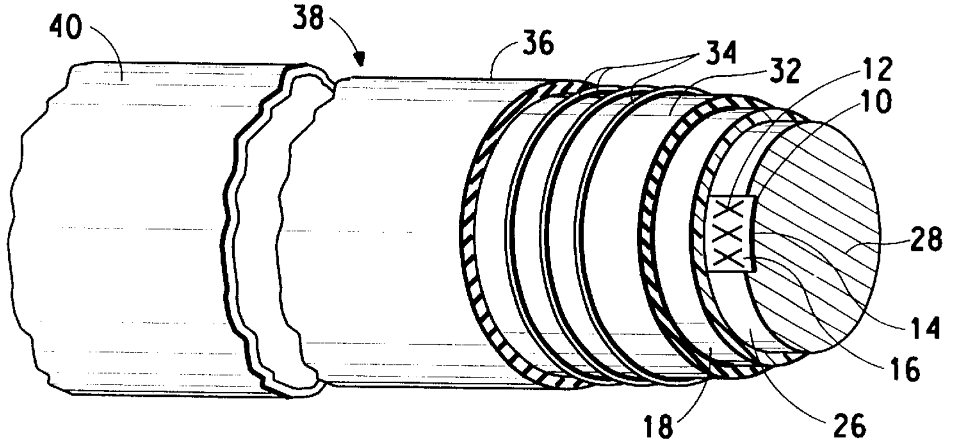
FIG. 2 is a perspective view of a belt sleeve which is formed in a preferred process in accordance with the invention useful in the manufacture of V-belts or banded belts.
Figure 3:
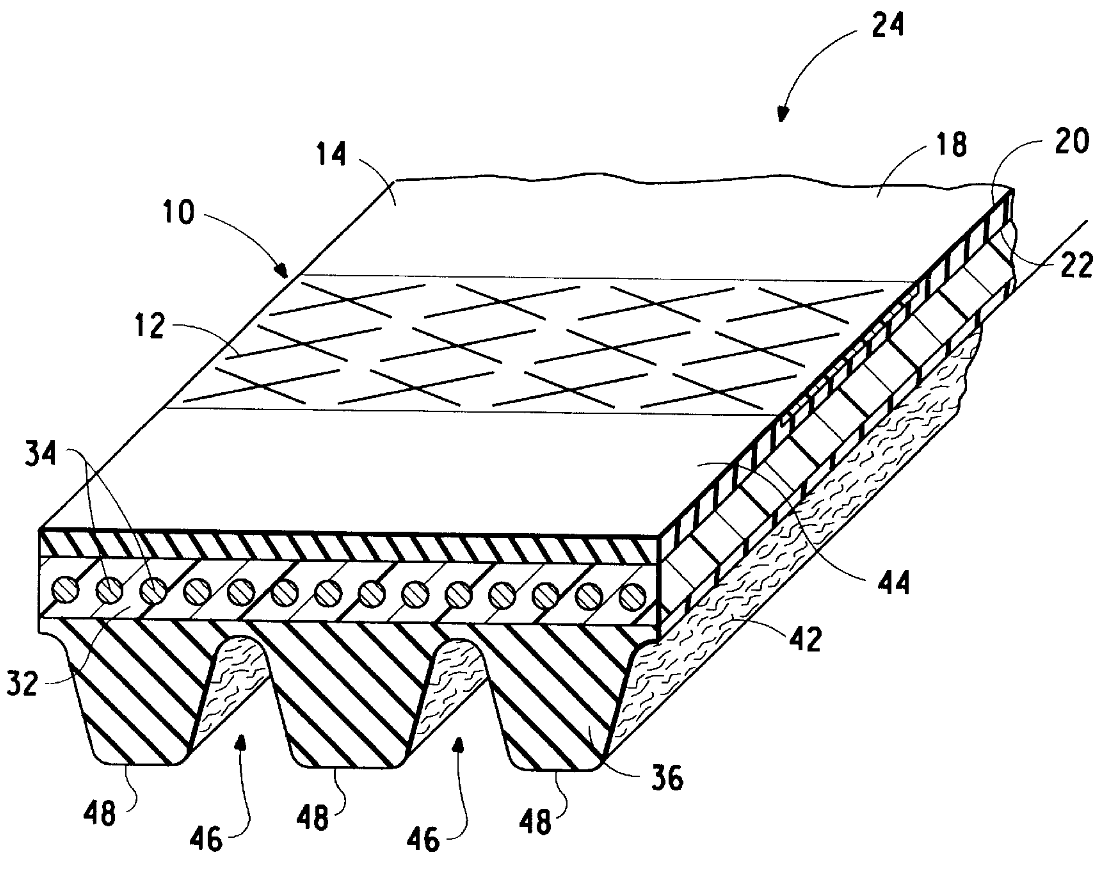
FIG. 3 is a fragmentary perspective view of a completed banded power transmission belt including indicia applied in accordance with the present invention which provides an indicia bearing elastomeric article with a smooth outer surface.

Referring now to FIGS. 2 and 3, the article includes an elastomer layer 18 (as best shown in FIG. 3 as part of a completed elastomeric article) which has an outer surface 20 and an inner surface 22. The inner surface 16 of the polymer film 10 is bonded to the outer surface 20 of elastomer layer so that the outer surface 14 of the polymer film 10 is flush with the outer surface 20. Bonding may be accomplished in certain embodiments with the use of primers and adhesives applied to either the polymer film or the elastomer layer. However, the polymer film is preferably surface treated (as explained in more detail below) so that it can be directly bonded to the elastomer layer without the need for primers and/or adhesives.

The elastomer layers of the present invention can be derived from an uncured elastomeric material which includes suitable curing agents or alternatively it can be a thermoplastic elastomeric material. Suitable elastomeric materials can include nitrile rubber, chlorinated polyethylene, neoprene, chlorosulfonyl polyethylene, ethylene ether polysulfides, ethylene polysulfides, ethylene propylene copolymers, ethylene propylene terpolymers, fluorinated hydrocarbon elastomer, chlorosilicone, isobutylene, isoprene, acrylic rubbers, polybutadienes, polyepichlorohydrines, natural rubber, synthetic isoprene urethane rubbers, as well as styrene butadiene copolymer elastomer. Suitable thermoplastic elastomers include styrenic thermoplastic elastomer, polyolefin thermoplastic elastomer, thermoplastic polyurethane elastomer, polyester thermoplastic elastomer, polyamide thermoplastic elastomer, thermoplastic polybutadiene ethylene-vinyl acetate copolymer thermoplastic, natural rubber, thermoplastic PVC/nitrile rubber, fluorocarbon elastomer, chlorinated polyethylene elastomer, and thermoplastic styrene-butadiene rubber. The elastomer may contain any of a wide variety of known additives such as pigments, carbon black, silica, plasticizers, accelerators, vulcanizing agents, etc.

Process

The present invention further provides for a simplified manufacturing process for forming an indicia bearing elastomeric article. The polymer film with indicia becomes an integral part of the elastomeric article eliminating the need to remove transfer material that requires disposal. In the preferred embodiment of the process as will be described below the polymer film is surface treated to allow for direct bonding with an elastomer layer, thereby eliminating the application of primers and adhesives.

The process of the present invention includes forming a polymer film having an outer and inner surface; applying indicia to one of the surfaces of the polymer film; applying the polymer film with indicia to an elastomer layer having an outer and inner surface wherein the inner surface of the film is applied to the outer surface of the elastomer layer; and pressing the polymer film and the elastomer layer under conditions such that the film is bonded to and flush with the outer surface of the elastomer layer thereby making smooth the outer surface of the elastomeric article. If the elastomer is uncured, the elastomer can be cured during or subsequent to pressing the polymer film and the elastomer layer.

Polymer film for use in accordance with the invention can be made in any of a wide variety of known processes suitable for the type of polymer film being employed. In a preferred embodiment employing a fluoropolymer film, the film can be formed from fluid compositions which are either (1) solutions or (2) dispersions of fluoropolymer. Films are formed from such solutions or dispersions of fluoropolymer by casting or extrusion processes. In the case of fluoropolymers which are melt processible, melt extrusion processes are possible.

In a preferred form of the invention using films of polyvinyl fluoride (PVF), suitable films can be prepared from dispersions of the fluoropolymer. The nature and preparation of such dispersions are described in detail in U.S Pat. Nos. 2,419,008; 2,510,783; and 2,599,300. Suitable PVF dispersions can be formed in, for example, propylene carbonate, N-methyl pyrrolidone, y-butyrolactone, sulfolane, and dimethyl acetamnide. The concentration of PVF in the dispersion will vary with the particular polymer and the process equipment and the conditions used. In general, the fluoropolymer will comprise from about 30 to about 45% by weight of the dispersion.

In a preferred embodiment of this invention, the films will be optically clear as explained above. However, in an alternate embodiment, various color and opacity effects can be achieved by incorporating pigments and fillers in the polyvinyl fluoride dispersion during manufacture.

Films of polyvinyl fluoride may be formed by extrusion procedures such as those described in U.S. Pat. Nos. 3,139,470 and 2,953,818. These patents describe the feeding of polyvinyl fluoride dispersion to a heated extruder which is connected to a slotted casting hopper. A tough coalesced extrudate of polyvinyl fluoride is extruded continuously in the form of a film containing latent solvent. The film can be merely dried or, alternately, can be heated and stretched in one or more directions while the solvent is volatilized from the film. When stretching is used, oriented film is produced. Alternatively, films of polyvinyl fluoride can be cast from dilute dispersions of the polymer in latent solvent and unoriented films are produced. Cast, niultilayer polyvinyl fluoride structures as those described in U.S. Pat. No. 4,877,683 may also be used in place of a single film of PVF.

In fluoropolymer film casting processes, the fluoropolymer is formed into its desired configuration by casting the dispersion onto a support, by using any suitable conventional means, such as spray, roll, knife, curtain, gravure coaters, or any other method that permits applying a substantially uniform film without streaks or other defects. The thickness of the cast dispersion is not critical, so long as the resulting film has sufficient thickness to be self-supporting and be satisfactorily removed from the substrate onto which the dispersion is cast. In general, a thickness of at least about 0.25 mil (6.4 $\mu$m) is satisfactory, and thicknesses of up to about 15 mils (381 $\mu$m) can be made by using the dispersion casting techniques of the present invention. A wide variety of supports can be used for casting films according to the present invention, depending on the particular polymer and the coalescing conditions. The surface onto which the dispersion is cast 'should be selected to provide easy removal of the finished film after it is coalesced. While any suitable support can be employed for casting the fluoropolymer dispersion, examples of suitable supports include polymeric films or steel belts.

After casting the fluoropolymer dispersion onto the support, the fluoropolymer is then heated to coalesce the fluoropolymer into a film. The conditions used to coalesce the polymer will vary with the polymer used, the thickness of the cast dispersion, among other operating conditions. Typically, when employing a PVF dispersion, oven temperatures of from about 340° F. (171° C.) to about 480° F. (249° C.) can be used to coalesce the film, and temperatures of about 380° F. (193° C.) to about 450° F. (232° C.) have been found to be particularly satisfactory. The oven temperatures, of course, are not representative of the temperatures of the polymer being treated, which will be lower. After coalescence, the finished film is stripped from the support by using any suitable conventional technique.

In a preferred embodiment, the surface of the polymer film that is to be bonded to the elastomer layer is surface treated to enhance adherability. The surface treatment can be achieved by exposing the film to a gaseous Lewis acid, to sulfuric acid or to hot sodium hydroxide. Preferably, the surface can be treated by exposing one or both surfaces to an open flame while cooling the opposite surface. Treatment to enhance adherability can also be achieved by subjecting the film to a high frequency, spark discharge such as corona treatment. Additional treatments such as alkali metal bath treatments or ionizing radiation, e.g., electron beams, may also be useful.

Further, if desired or when necessary for certain types of elastomers, an adhesive may be applied either to the polymer film or to the elastomer layer to enhance bonding between the film and elastomer layer. Suitable adhesives for fluoropolymer films such as amine functional acrylic copolymer have been disclosed in U.S. Pat. No. 3,133,854 to Simms and alkyl ester copolymers, modified polyolefins, or blends thereof have been disclosed in U.S. Pat. No. 5,139,878 to Kim et al. Especially suitable are acid modified polyolefin adhesives are sold by The DuPont Company under the trademark BYNEL®. The acid modified polyolefin may be selected from the group consisting of (1) copolymers of ethylene and at least one first comonomer of unsaturated carboxylic acid or derivative of the acid, (2) olefin polymer grafted with at least one unsaturated carboxylic acid or derivative of the acid, and (3) blends of the copolymers and the grafted olefin polymers. As disclosed in PCT publication WO 00/22032, the fluoropolymer film may be coated with a primer of amine functional polymer and an overcoat of a thermoplastic adhesive of acid modified polyolefin prior to application of the film to the elastomer layer to aid in enhanced bonding.

The process of this invention includes applying indicia to one of the surfaces of the polymer films. If as in the preferred embodiment, the polymer film is surface treated polyvinyl fluoride, the indicia can be applied directly to the film producing letters and symbols with excellent definition. If an adhesive is used as suggested above, the film is preferably coated with adhesive prior to the application of the indicia. The well defined indicia of this invention are characterized by straight, sharp edges. If as in the most preferred embodiment, the indicia is applied to the inner surface of clear polyvinyl fluoride film, both solvent based inks and water based inks can be used since the polymer film serves as, protective covering shielding the indicia from the wear, heat and solvent effects.

To further explain the process of this invention, polymer film 10 with indicia 12 is shown in FIG. 2 as used in the manufacture of power transmissions belts such a V-belts or banded belts (banded belt employing a curable elastomer illustrated in FIG. 3). Referring to FIGS. 2 and 3, polymer film 10 with indicia 12 on one of its surfaces is placed against the concave surface 26 of the steel mandrel of molding drum 28. The concave surface 26 may be sprayed with a release film prior to applying polymer film 10 to aid in eventually releasing the finished article. In the preferred embodiment, indicia 12 is reverse printed on the inner surface 16 of the polymer film 10 and the polymer film is applied so that the outer surface 14 of the film faces the concave surface 26 of the molding drum 28 along the entire axial extent thereof. The layers which will form the banded belt 24 are then built sequentially around the molding drum 28. For purposes of example, a number of layers in a predetermined order are described below. However, it is to be understood that virtually any combination of belt components is contemplated by the invention.

An elastomer layer 18 which is thin, tacky and curable is applied to concave surface 26 of the mandrel with polymer film 10 applied. If the polymer film has been surface treated to promote adherability, there is usually no need for any additional primers or adhesives between the polymer film 10 and the elastomer layer 18. The elastomrer layer 18 is followed by a second elastomer layer 32. The outside surface of second elastomer layer 32 is wrapped with load carrying cords 34 in a spiral pattern. Any number of elastomer layers and cord layers could be used. A compression elastomer layer 36 is then wrapped over the cords 34 to produce a belt sleeve 38 from which a plurality of power transmission belts, e.g., V-belts or banded belts 24 can be severed. The belt sleeve 38 is placed in a jacket 40 to be vulcanized (cured).

The load carrying cords can be made from nylon, polyester or aramid fiber. The compression elastomer layer 36 is shown to have embedded therein laterally oriented cut fibers 42. These fibers can be aramid fibers, polyester fibers, nylon fibers, cotton fibers, etc.

During vulcanization, the polymer film layer 10 is pressed against the elastomer layer 18 with a pressure of 6–12 kgf/cm$^2$ and simultaneously heated to 150° C.–170° C. If polyvinyl fluoride film is used as the polymer film, vulcanizing temperatures may reach 190° C. or higher. Using fluoropolymer films such as polyvinyl fluoride which are thermally resistant for labeling elastomeric articles permits use of higher temperatures which shortens the curing time and thereby leads to an overall shorter processing time.

While pressing the polymer film and the elastomer layer, the inner surface 14 of the polymer film is bonded to the outer surface 20 of the elastomer layer 18 becoming flush with the, elastomer layer. No depression, step or other surface irregularity is formed on the outer surface 44 of belt 24 thereby making the outer surface smooth. Further the polymer film 10 becomes an integral part of the elastomeric article with no part of the polymer film needing to be removed after vulcanization. In contrast to prior art transfer release processes, a manufacturing step is eliminated and there is no need to collect and dispose of scraps of polymer film.

After vulcanization, the belt sleeve 38 is removed from the molding drum 28 and trained around a set of pulleys (not shown) which are driven around substantially parallel axes. The belt sleeve 38 is positioned with the compression elastomer layer exposed to a rotating grinding wheel (not shown) situated adjacent to one of the pulleys with its cerntral axis parallel to the axis of the pulley. The grinding wheel is rotated in the opposite direction to the movement of the belt sleeve 38 over the pulleys to produce lengthwise grooves 46 and ribs 48 as illustrated in FIG. 3 for a completed banded belt 24.

Once grooves 46 are cut in the belt sleeve 38, individual banded belts 24 can be cut from belt sleeve 38. If desired, V-belts could be produced by cutting at each groove 46. The severed belts 24 are then turned inside out with orientation of the elastomeric article as shown in FIG. 3. The belt 24 is composed of polymer film 10 with indicia 12 on its inner surface 14 bonded flush with the outer surface 20 of elastomer layer 18 to form a smooth outer surface 44 on the elastomeric article, belt 24.

For belts, smoothness can be measured by reduced noise generation. Noise in terms of sound pressure is measured, e.g., comparisons in sound pressure are made for belts moving on a pulley. For belts of the present invention there is no identifiable increase in sound pressure attributable to the indicia on the belt in direct contrast to a belt prepared by the transfer release process of the prior art. For other elastomeric articles such as mats or hoses, smooth is characterized visually in that there is no apparent surface irregularity between the polymer film with indicia and the elastomer layer on the outer surface of the elastomeric article.

When the preferred surface treated PVF films are used for application of indicia to power transmission belts for automotive use, the surface treated PVF adheres surprisingly well to the cured elastomer and can remain intact and well adhered for the life of the belt. In the form of the invention where the indicia is applied to the inner surface 16 of the polymer film 10, the well adhered PVF can thereby provide protection for the indicia so that it remains readable for life of the belt.

In another embodiment of this invention, an elastomeric article such as a tire or a hose, may be constructed similarly to the article described above having a protective polymer film with indicia however, without the requirement of the polymer film being flush to the elastomer layer causing a smooth outer surface on the elastomeric article. In this embodiment, the invention relates to an indicia bearing elastomeric article having an outer surface comprising an elastomer layer having an outer and inner surface; a clear polymer film having an outer and inner surface, the film having indicia on its inner surface, wherein the inner surface of the clear polymer film is bonded to the outer surface of the elastomer layer and which clear polymer film serves as a protective covering for the indicia sandwiched between the polymer film and the elastomer layer, the indicia being visible through the protective covering.

What is claimed is:

1. An indicia bearing elastomeric article having an outer surface, said article comprising:

an elastomer layer having an outer and inner surface;

a polymer film having an outer and inner surface, said film having indicia on one of said surfaces, said film being a fluoropolymer film comprising a fluoropolymer selected from the group consisting of polymers and copolymers of trifluoroethylene, hexafluoropropylene, monochlorotrifluoroethylene, dichlorodifluoroethylene, tetrafluoroethylene, vinylidene fluoride and vinyl fluoride;

wherein said inner surface of said polymer film is bonded to said outer surface of said elastomer layer and said outer surface of said polymer film is flush with said outer surface of said elastomer layer making smooth said outer surface of said elastomeric article.

2. The article of claim 1 wherein said polymer film is clear and said indicia is present on said inner surface of said polymer film and said polymer film serves as a protective covering for said indicia sandwiched between said polymer film and said elastomer layer, said indicia being visible through said protective covering.

3. The article of claim 1 wherein said inner surface of said polymer film is directly bonded to said outer surface of said elastomer layer.

4. The article of claim 3 wherein said polymer film is polyvinyl fluoride.

5. The article of claim 1 wherein said article is a belt.

6. The article of claim 1 wherein said article is a hose.

* * * * *